United States Patent
Watanabe

(10) Patent No.: US 6,512,893 B2
(45) Date of Patent: Jan. 28, 2003

(54) DEVICE FOR UNLOCKING CARTRIDGE CHAMBER LID OF CAMERA

(75) Inventor: Hajime Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/767,504

(22) Filed: Jan. 23, 2001

(65) Prior Publication Data

US 2001/0033746 A1 Oct. 25, 2001

(30) Foreign Application Priority Data

Jan. 31, 2000 (JP) ........................................ 2000-021071

(51) Int. Cl.[7] .......................... G03B 17/02; G03B 17/00
(52) U.S. Cl. ....................... 396/538; 396/300; 396/543; 396/297
(58) Field of Search ................................. 396/538, 536, 396/300, 413, 535, 543, 299, 297

(56) References Cited

U.S. PATENT DOCUMENTS 4,026,101 A * 5/1977 Moyer ......................... 368/188
5,432,575 A * 7/1995 Funahashi .................... 396/405
5,568,224 A * 10/1996 Saegusa ....................... 396/300
5,903,791 A * 5/1999 Okada ......................... 396/535
RE36,865 E * 9/2000 Tosaka et al. ............... 396/243

* cited by examiner

Primary Examiner—Russell Adams
Assistant Examiner—Andrew Sever
(74) Attorney, Agent, or Firm—Robin, Blecker & Daley

(57) ABSTRACT

A camera of the kind using a cartridge with the cartridge accommodated inside a cartridge chamber is required to ensure that the lid of the cartridge chamber is openable only when film has been rewound into the cartridge. To meet this requirement, there is a known method for unlocking the cartridge chamber lid only when the film has been rewound. However, in the event of some accident, it might become impossible to rewind the film to make the cartridge chamber lid no longer unlockable. To solve this problem, a camera according to the invention disclosed is arranged to make the cartridge chamber lid unlockable in response to a specific operation performed differently from an ordinary photo-taking operation.

9 Claims, 5 Drawing Sheets

PHOTO-TAKING STAND-BY POSITION
(LID-LOCKING POSITION)

DRAWN-IN POSITION
(LID-LOCKING POSITION)

SUPER-DRAWN-IN POSITION
(LID-UNLOCKING POSITION)

DEVICE FOR UNLOCKING CARTRIDGE CHAMBER LID OF CAMERA

BACKGROUND OF THE INVENTION

1. Field of the Invention

The present invention relates to an improvement on a cartridge using apparatus and a camera having a lock mechanism which is arranged to be controlled and driven to a lock position or an unlocking position where a cartridge chamber lid is locked to or unlocked from a cartridge chamber.

2. Description of Related Art

A camera body is generally formed to include a cartridge chamber to accommodate therein a film cartridge with a cartridge chamber lid arranged to cover the cartridge chamber. A cartridge chamber lid locking device has heretofore been variously developed for preventing the cartridge chamber lid from being opened by mistake.

For example, a cartridge chamber lid locking device disclosed in Japanese Laid-Open Patent Application No. Hei 6-258699 is composed of a lock member arranged to be settable at a locking position at which the cartridge chamber lid is locked to a closed state or at an unlocking position at which the cartridge chamber lid can be opened or closed, a lens barrel drive transmission member arranged to be capable of setting the lock member either at the locking position or at the unlocking position according to the movement of a lens barrel, and a driving means for driving the lens barrel. Since a film would be exposed to light if the cartridge chamber lid happens to be inadvertently opened by mistake with the film in a state of having been pulled out from a film cartridge loaded in the cartridge chamber, the cartridge chamber lid locking device is arranged such that, with the film in the pulled-out state, the driving means is driven to set the lock member at the locking position through the lens barrel drive transmission member. When the film is in a state of being completely stowed within the film cartridge, the driving means is driven to set the lock member at the unlocking position.

Meanwhile, it has been developed to provide a film cartridge with an index for indicating a film using state by rotating together with a cartridge spool which is disposed within the film cartridge. In rewinding the film, the stopping position of the cartridge spool is controlled to have a film using state, such as an unused state, a half used state or a full used state, indicated by the index.

Some of known cameras are provided with the cartridge chamber lid locking device disclosed in Japanese Laid-Open Patent Application No. Hei 6-258699 in combination with the above-stated function of indicating the film using state. The camera of this type is arranged to rewind the film, upon completion of photo-taking, in relation to timing of setting the lock member at the unlocking position, to finish the film rewinding action with a leader part of the film having been pulled into the film cartridge, and to adjust the position of the index. After the completion of adjustment of the position of the index, the cartridge chamber is allowed to become openable and closable by driving the lens barrel in such a way as to have the lock member set at the unlocking position.

It is also known to arrange a safety lock device to effect change-over from an unlocking state to a locking state and vice versa according to the direction of film driving. The safety lock device is arranged to be set into the locking state in a case where a film happens to come to a stop due to some reason while film rewinding is still in process.

BRIEF SUMMARY OF THE INVENTION

It is an object of the invention to provide a cartridge using apparatus and a camera which are arranged to be capable of unlocking a cartridge chamber lid, without necessitating any overhaul work nor any additional member for taking a film cartridge out from a cartridge chamber for repair, even in a case where an unlocking action on the cartridge chamber lid happens to be inhibited due to some accident.

To attain the above object, in accordance with an aspect of the invention, there is provided a camera having a cartridge chamber arranged to accommodate therein a cartridge having a film stowed therein, the camera comprising a lock mechanism having a locking state in which a lid of the cartridge chamber is locked to the cartridge chamber and an unlocking state in which the lid of the cartridge chamber is unlocked to be openable and closable, the lock mechanism being arranged to operate according to movement of a lens barrel in such a way as to come into the locking state when the lens barrel is located within a first range of position including a photo-taking position and to come into the unlocking state when the lens barrel is located at a specific position which differs from the first range of position, a lens driving mechanism arranged to move the lens barrel to the specific position when a predetermined condition including completion of film rewinding is satisfied, and a control circuit arranged to cause the lens driving mechanism to drive the lens barrel to the specific position in response to a specific operation when the predetermined condition is not satisfied.

In accordance with another aspect of the invention, there is provided a camera or a cartridge using apparatus having a cartridge chamber arranged to accommodate therein a cartridge having a film stowed therein, the camera or the cartridge using apparatus comprising a lock mechanism arranged to be controlled and driven to one of a locking position for locking a lid of the cartridge chamber to the cartridge chamber and an unlocking position for unlocking the lid of the cartridge chamber to be openable and closable, a first control circuit arranged to judge whether a predetermined operation condition is satisfied and, if the predetermined operation condition is satisfied, to control and drive the lock mechanism from the locking position to the unlocking position, and a second control circuit arranged to allow the lock mechanism to be driven from the locking position to the unlocking position in response to a specific operation if the predetermined operation condition is not satisfied.

In accordance with a further aspect of the invention, there is provided a camera or a cartridge using apparatus having a cartridge chamber arranged to accommodate therein a cartridge having a film stowed therein, the camera or the cartridge using apparatus comprising a lock mechanism arranged to be controlled and driven to one of a locking position for locking a lid of the cartridge chamber to the cartridge chamber and an unlocking position for unlocking the lid of the cartridge chamber to be openable and closable, a communication terminal capable of being connected to an adjustment tool and arranged to perform communication with the adjustment tool in a state of being connected to the adjustment tool, storage means having a driving control program stored therein for driving the lock mechanism from the locking position to the unlocking position, and a control circuit arranged to execute the driving control program upon receipt of predetermined data from the adjustment tool through the communication terminal.

These and further objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.
(First Embodiment)

Figure 1:
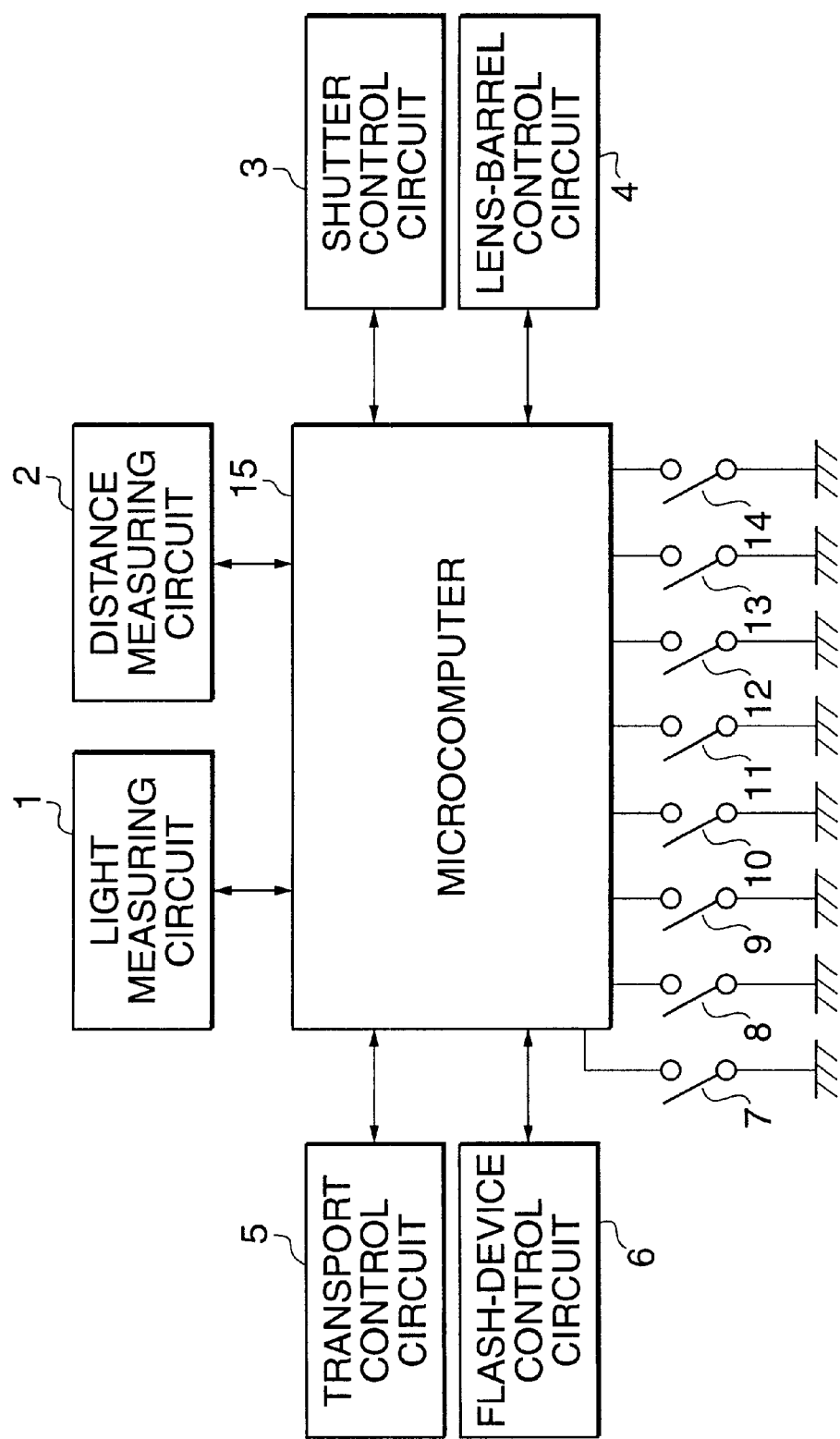
FIG. 1 is a block diagram showing the arrangement of essential parts of a camera according to a first embodiment of the invention.

FIG. 1 shows in a block diagram the arrangement of essential parts of a camera according to a first embodiment of the invention. In the first embodiment, the invention is applied to a zoom type compact camera.

Referring to FIG. 1, a light measuring circuit 1 is arranged to measure the luminance of an object of shooting. A distance measuring circuit 2 is arranged to measure a distance to the object. A shutter control circuit 3 is arranged to control a shutter. A lens-barrel control circuit 4 is arranged to control a lens barrel. The lens-barrel control circuit 4 includes a lens-barrel position detecting switch (not shown) which is arranged to detect the position of the lens barrel. A transport control circuit 5 is arranged to control winding and rewinding actions on a film. A flash-device control circuit 6 is arranged to control a flash device. A main switch 7 is the main power supply switch of the camera body. A switch 8 (SW1) is arranged to be turned on by the first stroke of operation on a release switch. With the switch 8 turned on, preparation for photo-taking (shooting), such as the light and distance measuring actions to be performed by the light measuring circuit 1 and the distance measuring circuit 2, are performed in a known manner. A switch 9 (SW2) is arranged to be turned on by the second stroke of operation on the release switch. With the switch 9 turned on, exposure and photo-taking actions are performed by the shutter control circuit 3 in a known manner.

A wide-angle switch 10 is arranged to shift the position of the zoom type lens barrel to a position on the wide-angle side of the lens barrel. A telephoto switch 11 is arranged to shift the position of the lens barrel to a position on the telephoto side of the lens barrel. A lid opening-and-closing detecting switch 12 is arranged to detect opening and closing actions on the lid of a cartridge chamber. In the case of the first embodiment, the cartridge chamber lid is considered to be open when the switch 12 is in its on-state. A manual rewinding switch 13 (hereinafter referred to as the MR switch) is arranged to enable the user of the camera to forcibly rewind the film before all frame portions of the film are used (exposed) for photo-taking. A mode selection switch 14 is provided for selection of a flash photography mode. A microcomputer 15 is arranged to control the camera having the construction described above. The microcomputer 15 has a ROM, a RAM and a timer disposed therein and is arranged to control photo-taking (shooting) actions in a known manner.

Figure 2A:
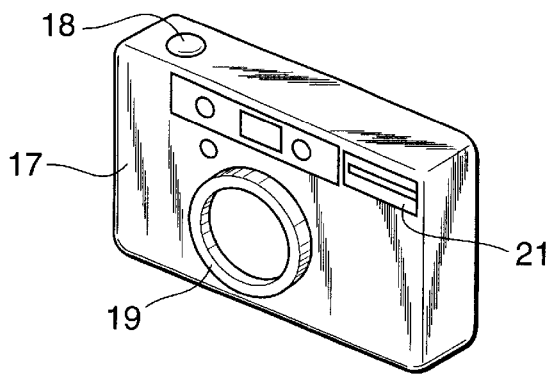
FIGS. 2(a), 2(b) and 2(c) are perspective views showing the camera according to the first embodiment.
Figure 2B:
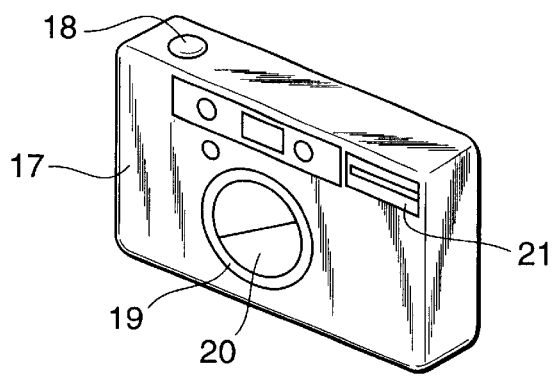
Figure 2C:
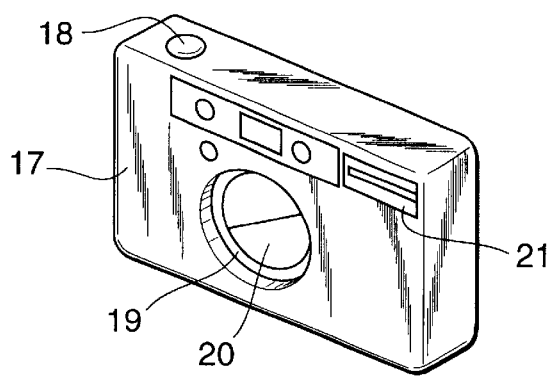

FIGS. 2(a), 2(b) and 2(c) show the camera having the construction described above when the lens barrel is at a photo-taking standby position, a drawn-in position and a super-drawn-in position which is obtained by drawing the lens barrel inward further from the drawn-in position, respectively.

Referring to FIGS. 2(a), 2(b) and 2(c), there are illustrated a camera body 17, the release switch 18 which is composed of the switch SW1 (8) and the switch SW2 (9), the lens barrel 19, a lens barrier 20 arranged to protect a lens and to close when the lens barrel 19 is at the drawn-in position, and a flash light emitting part 21.

The lens barrel 19 is connected to a lock member (not shown). The lock member is set in such a position as to lock the cartridge chamber lid (not shown) when the lens barrel 19 is located within a photo-taking area or at the drawn-in position which is in a non-photo-taking area. The lock member is set in such a position as to unlock the cartridge chamber lid when the lens barrel 19 is located within the area of the super-drawn-in position.

Figure 3:
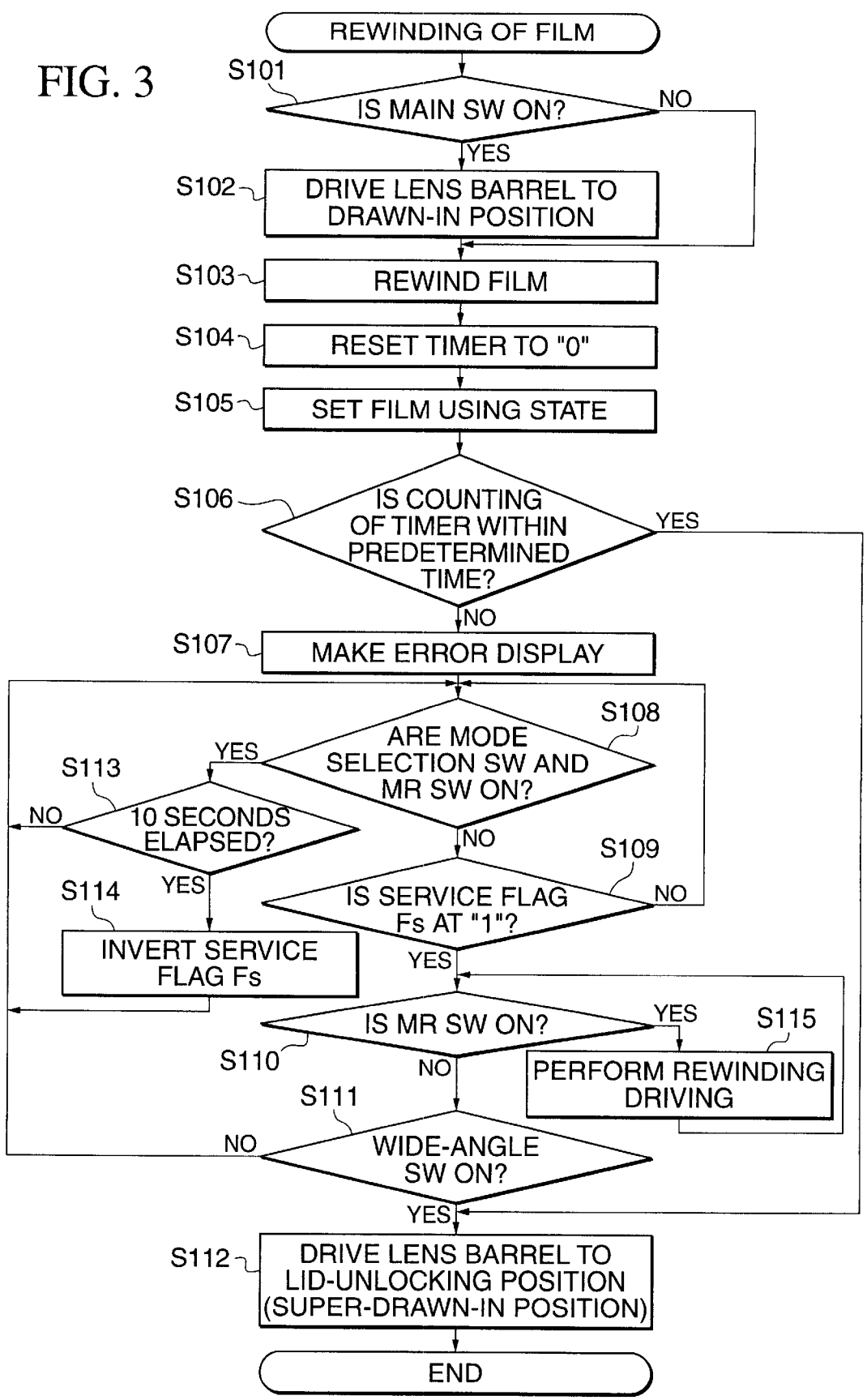
FIG. 3 is a flow chart showing the actions of the camera according to the first embodiment to be performed on a lens barrel in rewinding a film.

FIG. 3 is a flow chart showing a sequence of actions of the camera described above from the commencement of a film rewinding action through an unlocking action on a safety lock. In the first embodiment, a film rewinding process is assumed to be carried out either by automatic rewinding with the final end of the film detected in a known manner or by forced rewinding with the MR switch 13 pushed. The sequence of actions is described below with reference to the flow chart of FIG. 3.

At step S101, to drive the lens barrel 19 to the drawn-in position before the start of film rewinding, a check is made for the state of the main switch 7. If the main switch 7 is found to be in its on-state, the flow of operation proceeds to step S102. At the step S102, the lens barrel 19 is driven from the photo-taking stand-by position to the drawn-in position, and the flow proceeds to step S103. If the main switch 7 is found at the step S101 to be in its off-state thus indicating that the lens barrel 19 is already at the drawn-in position, the flow then proceeds from the step S101 directly to the step S103. The lens barrel is assumed to be automatically shifted to the drawn-in position when the main switch 7 of the camera is turned off from the on-state.

At the step S103, the microcomputer 15 instructs the transport control circuit 5 to perform film rewinding while making a check for the movement of the film in a known manner. For example, the movement of the film is found through the output of a photosensor (not shown) which is arranged in the neighborhood of an aperture of the camera to detect the perforations provided in the film. Upon completion of the film rewinding action, the flow proceeds from the step S103 to step S104. At the step S104, the timer which is disposed within the microcomputer 15 is reset to "0". At the next step S105, the timer is allowed to begin its time count. At the same time, the stopping position of an index (not shown) which is arranged on the film cartridge to rotate together with the spool of the film cartridge is controlled according to the using state of the film.

At step S106, a check is made for a correct set position of the index which is arranged to indicate a film using state. For this purpose, the time count by the timer is checked to find if it is within a predetermined period of time. If the index is found to be correctly set, the flow proceeds to step S112. At the step S112, such a control operation as to unlock the cartridge chamber lid is performed, and the sequence of rewinding control actions comes to an end.

As mentioned above, the safety lock mechanism in the first embodiment is controlled by controlling the stop position of the lens barrel 19. After the completion of film rewinding, the lens barrel 19 is at the drawn-in position to keep the cartridge chamber lid locked until the index setting action is completed. The cartridge chamber lid is allowed to be unlocked and released from a safety locked state after the index is correctly set. With the cartridge chamber lid thus unlocked, the film cartridge can be taken out from the cartridge chamber.

If the index is found at the step S106 to be not correctly set, the flow proceeds from the step S106 to step S107. At the step S107, a display device (not shown) is caused to make an error display. Since the lens barrel 19 still remains at the drawn-in position at that time, the cartridge chamber lid is kept in a locked state to prevent any erroneous indication of the film using state caused with the film inadvertently taken out by the user of the camera.

At the subsequent step S108, a check is made to find if a specific switch operation has been performed, i.e., if the mode selection switch 14 and the MR switch 13 are simultaneously turned on. If so, the flow proceeds to step S113. In the case of the first embodiment, the microcomputer 15 decides at the step S113 that the specific switch operation has been performed when both the mode selection switch 14 and the MR switch 13 are simultaneously turned on and kept in the on-states for 10 seconds or more. Such a switch operation is specified to be not normally performed by ordinary users but only by special persons such as camera repairmen. Therefore, the above-stated method for deciding the specific switch operation to have been performed may be changed to decide it when both the wide-angle side zoom switch 10 and the telephoto side zoom switch 11 are simultaneously kept in their on-states for 10 seconds or more. The deciding method also may be replaced with some other suitable operation method, such as the use of some other operation member.

If the above-stated specific switch operation is decided at the steps S108 and S113 to have been performed, the flow proceeds from the step S113 to step S114. At the step S114, the state of a service flag Fs is inverted. Since the service flag Fs is in the reset state in this instance, the set state of the service flag Fs is inverted from "0" to "1". With the camera thus decided and memorized to be in a special mode, the flow returns from the step S114 to the step S108.

If the specific switch operation is decided at the step S108 not to have been performed, the flow proceeds from the step S108 to step S109. At the step S109, a check is made to find if the service flag Fs is set at "1". If not, i.e., if the service flag Fs is found to be at "0", the flow returns to the step S108. If so, i.e., if the service flag Fs is found to be at "1", the flow proceeds from the step S109 to step S110. At the step S110, a check is made to find if the MR switch 13 is in its on-state. If so, the flow proceeds to step S115. At the step S115, the microcomputer 15 instructs the transport control circuit 5 to cause a motor (not shown) to rotate in the direction of film rewinding. These steps S110 and S115 are continuously repeated as long as the MR switch 13 is pushed. When the MR switch 13 is released from the pushing operation, the film transport control action comes to a stop. The motor is thus controlled to rotate in the film rewinding direction as long as the MR switch 13 is in its on-state.

When the MR switch 13 is decided to be not in its on-state, the flow proceeds from the step S110 to step S111. At the step S111, a check is made to find if the wide-angle switch 10 is turned on. If not, the flow returns from the step S111 to the step S108. If so, the flow proceeds from the step S111 to the step S112. At the step S112, the microcomputer 15 instructs the lens-barrel control circuit 4 to drive the lens barrel 19 to the super-drawn-in position, which is located further inward from the drawn-in position. By this step, the cartridge chamber lid is unlocked to permit the film cartridge to be taken out from the cartridge chamber.

The first embodiment described above is arranged not to unlock and cancel the safety lock, i.e., not to shift the flow from the step S106 to the step S112, if the film using state indicating index is not correctly set. The invention is, however, not limited to this arrangement. This arrangement may be changed to shift the flow of operation to the step S107 to have the safety lock not canceled (unlocked) also in a case where the completion of film rewinding at the step S103 is not correctly detected. In that instance, the film might still remain outside of the film cartridge. Therefore, the film then can be forcibly rewound by executing the step S115 through the step S110.

According to the arrangement of the first embodiment described above, in a case where the cartridge chamber lid cannot be unlocked and released from the safety lock by a normal sequence of actions due to some reason, i.e., if a predetermined condition for unlocking is not satisfied, the cartridge chamber lid is not allowed to be unlocked until the specific operation is performed. The arrangement prevents the user from taking out the film by mistake and reusing the film with an erroneous indication of the film using state left on the film cartridge. Further, the arrangement permits taking out the film cartridge for repair by canceling the safety lock with the specific operation without recourse to any overhauling work on the camera.

Further, since the index of the film cartridge taken out for repair does not correctly indicate the film using state, the index of the film cartridge is preferably set at a completely-used-state indicating position by using some special tool before returning the camera to the user after the repair.

The unlocking means in the first embodiment is not limited to the specific switch operation but may be replaced with some other suitable means. For example, a switch for repair service may be arranged at the bottom of the camera and hidden with some seal member or the like to be operated to cancel the safety lock.

(Second Embodiment)

Figure 4:
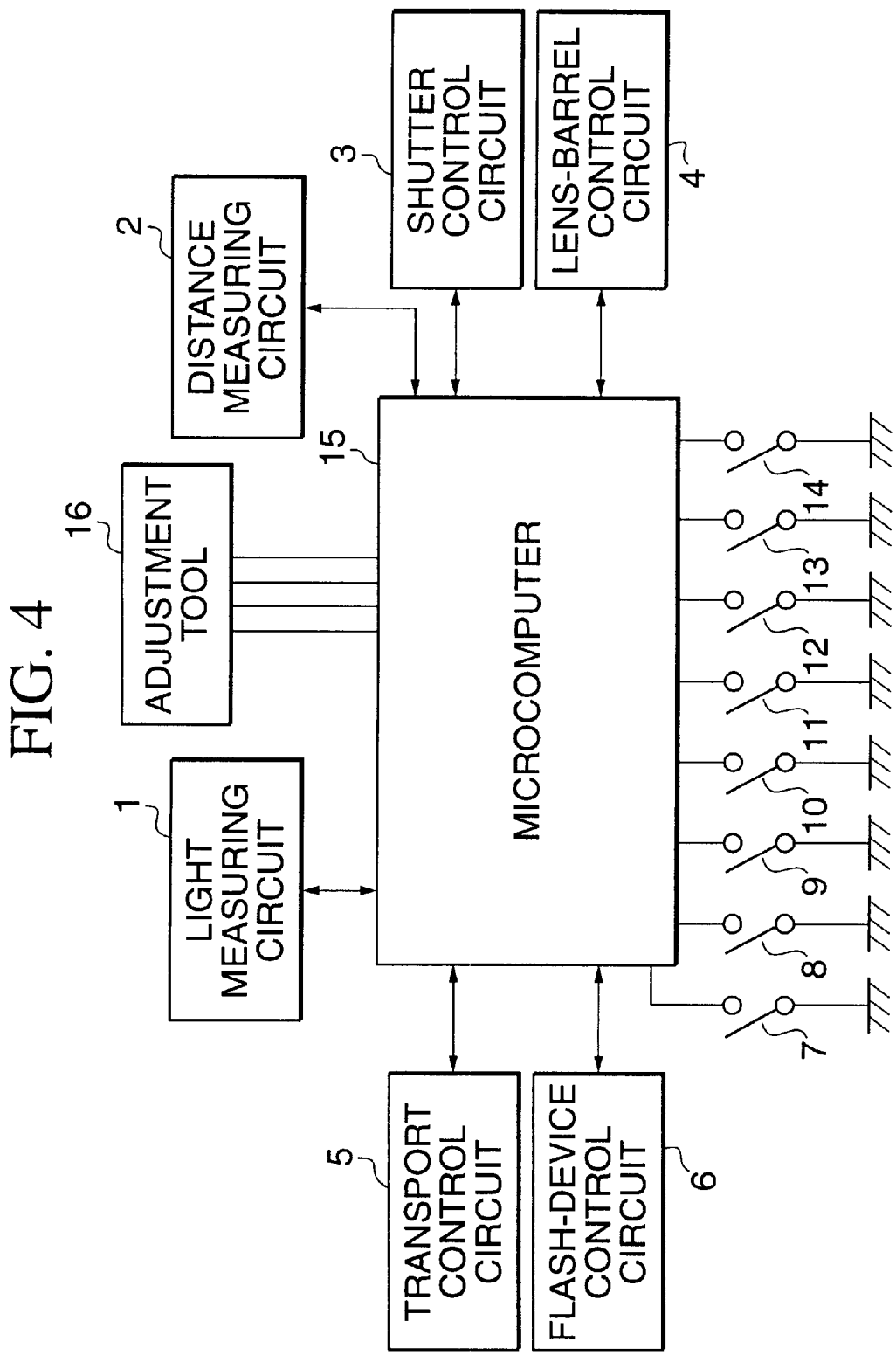
FIG. 4 is a block diagram showing the arrangement of essential parts of a camera according to a second embodiment of the invention.

FIG. 4 is a block diagram showing the arrangement of essential parts of a camera according to a second embodiment of the invention. All parts of the second embodiment that are the same as those of the first embodiment are denoted by the same reference numerals as those in FIG. 1, and the details of them are omitted from the description.

Referring to FIG. 4, an adjustment tool 16 is connected to the camera through a serial communication terminal (not shown). The adjustment tool 16 is arranged to read and write data of varied kinds from and into a memory disposed within the microcomputer 15 or a nonvolatile memory (not shown). The adjustment tool 16 is arranged discretely from the camera and arranged to be connected to the camera for adjustment at a factory or the like.

Figure 5:
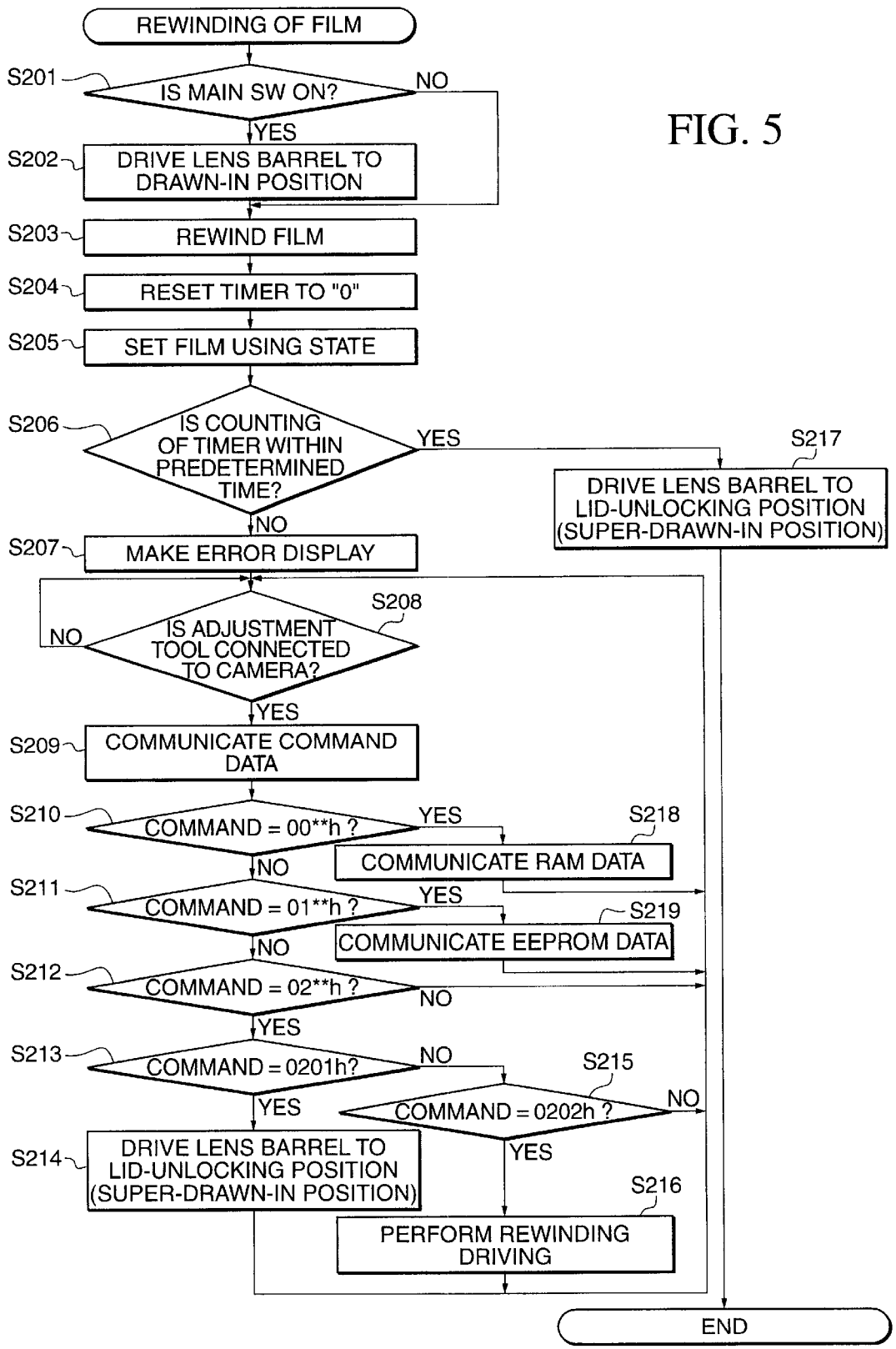
FIG. 5 is a flow chart showing the actions of the camera according to the second embodiment to be performed on a lens barrel in rewinding a film.

FIG. 5 shows in a flow chart a flow of operation of the camera according to the second embodiment. A sequence of actions, from the commencement of a film rewinding action through an unlocking action on the safety lock mechanism, is next described with reference to FIG. 5. The flow of operation shown in FIG. 5 corresponds to that of the first embodiment shown in FIG. 3. A program for the sequence of actions is stored at a ROM, etc., which is disposed within the microcomputer 15.

At step S201 of FIG. 5, to drive the lens barrel 19 to the drawn-in position before the start of film rewinding, a check is made for the state of the main switch 7. If the main switch 7 is found to be in its on-state, the flow of operation proceeds to step S202. At the step S202, the lens barrel 19 is driven from the photo-taking stand-by position to the drawn-in position, and the flow proceeds to step S203. If the main switch 7 is found at the step S201 to be in its off-state thus indicating that the lens barrel 19 is already at the drawn-in position, the flow then proceeds from the step S201 directly to the step S203.

At the step S203, the microcomputer 15 instructs the transport control circuit 5 to perform film rewinding by making a check for the movement of the film in a known manner. For example, the movement of the film is found through the output of a photosensor (not shown) which is arranged in the neighborhood of an aperture of the camera to detect the perforations provided in the film. Upon completion of the film rewinding action, the flow proceeds from the step S203 to step S204. At the step S204, the timer which is disposed within the microcomputer 15 is reset to "0". At the next step S205, the timer is allowed to begin its time count. At the same time, the stopping position of an index (not shown) which is arranged on the film cartridge to rotate together with the spool of the film cartridge is controlled according to the using state of the film.

At the subsequent step S206, a check is made for a correct set position of the index which indicates the film using state. For this purpose, the time count by the timer is checked to find if it is within a predetermined period of time. If the index is thus found to be correctly set, the flow proceeds to step S217. At the step S217, such a control operation as to unlock the cartridge chamber lid is performed, and the sequence of rewinding control actions comes to an end.

As in the case of the first embodiment, the safety lock mechanism (not shown) is operated through control over the stopping position of the lens barrel 19. After the completion of film rewinding, the cartridge chamber lid is locked until the completion of a setting action on the above-stated index as the lens barrel 19 is then at the drawn-in position. Control over unlocking the cartridge chamber lid is performed to permit the film cartridge to be taken out only after the index is correctly set.

If the index is decided at the step S206 to be not correctly set, the flow proceeds from the step S206 to step S207 to make an error display. Then, since the lens barrel 19 remains at the drawn-in position, the cartridge chamber lid is kept locked to prevent any erroneous indication of the film using state from being left on the film cartridge with the film inadvertently taken out by the user of the camera. At the subsequent step S208, a check is made to find if the adjustment tool 16 is connected to the camera. In the case of the second embodiment, a connection detecting switch (not shown) is arranged to turn on to indicate a connected state when the adjustment tool 16 is connected to the camera. With the adjustment tool 16 decided at the step S208 to be connected, the flow proceeds from the step S208 to step S209 to conduct serial communication with the adjustment tool 16. While the details of a method for the communication with the adjustment tool 16 are omitted from the description, the microcomputer 15 is arranged to detect a communication request from the adjustment tool 16 to enable the camera to conduct the communicate with the adjustment tool 16.

At the next step S210, a check is made for command data sent from the adjustment tool 16. In the case of the second embodiment, the command data is composed of 16 bits. The microcomputer 15 is arranged to be in a mode of having access to data of a built-in RAM when the code of 8 bits of high order of the command data is "00h" and to be in a mode of having access to an EEPROM (not shown), which is a nonvolatile memory, when the code of 8 bits of high order is "01h". The code of 8 bits of low order of the command data is provided for designating an applicable address of the memory to be accessed. The command data is checked at the step S210 to find if it indicates "00h". If not, the flow proceeds to step S211 to find if the command data is "01h". If not, the flow proceeds to step S212 to find if the code of 8 bits of high order of the command data indicates "02**h".

In a case where the code of 8 bits of high order of the command data indicates "02**h", the command data is for a mode of executing a specific subroutine (a driving control program) stored in the microcomputer 15. In that case, the code of 8 bits of low order enables the microcomputer 15 to select the subroutine to be executed.

If the code of 8 bits of high order of the command data as communicated is found at the step S212 to be "02**h", the flow proceeds from the step S212 to step S213. At the step S213, a check is made to find if the command data is "0201h". If so, the flow proceeds to step S214, where the microcomputer 15 instructs the lens-barrel control circuit 4 to unlock the cartridge chamber lid. If not, the flow proceeds from the step S213 to step S215. At the step S215, a check is made to find if the command data is "0202h". If not, the flow returns to the step S208. If so, the flow proceeds from the step S215 to step S216. At the step S216, the microcomputer 15 instructs the transport control circuit 5 to rewind the film.

Further, at the above-stated step S210, if the command data is found to be "00**h", the flow proceeds from the step S210 to step S218. At the step S218, the built-in RAM is accessed to read or write data at an address designated by a step which is not shown. After that, the flow returns to the step S208.

Further, at the step S211, if the command data is found to be "b 01**h", the flow proceeds from the step S211 to step S219. At the step S219, the built-in EEPROM is accessed to read or write data at an address designated by a step which is not shown. After that, the flow returns to the step S208.

According to the arrangement of the second embodiment described above, in a case where the cartridge chamber lid cannot be unlocked and released from the safety lock by a normal sequence of actions due to some reason, the adjustment tool 16 is connected to the camera to execute a subroutine for allowing the cartridge chamber lid to be unlocked from the safety lock. The arrangement prevents the user from taking out the film by mistake and reusing the film with an erroneous indication of the film using state left on the film cartridge.

Further, the arrangement permits taking out the film cartridge for repair by connecting and using the adjustment tool 16 to easily cancel the safety lock without overhauling the camera.

Further, since the index of the film cartridge taken out for repair does not correctly indicate the film using state, the index of the film cartridge is preferably set at a completely-used-state indicating position by using some special tool or the like before returning the camera to the user after the repair.

In each of the embodiments described above, the safety lock mechanism for the cartridge chamber lid is arranged to be driven to the locking position or to the unlocking positions according to the movement of the lens barrel. The invention is, however, not limited to this arrangement. For example, the safety lock mechanism may be arranged to permit change-over between locking and unlocking states according to the direction in which the film is driven. The safety lock mechanism also may be replaced with an open switch which is provided for opening and closing the cartridge chamber lid and arranged to permit the cartridge chamber lid to be opened by pushing the open switch. Each of such modifications is arranged either to permit unlocking by a specific operation when the unlocking action on the safety lock is inhibited as in the case of the first embodiment or to be provided with a driving control program for canceling the safety lock in accordance with data from the adjustment tool as in the case of the second embodiment.

While the invention is applied to a camera in the case of each embodiment disclosed, the invention is not limited to cameras but is applicable also to any other apparatuses arranged to operate with recording media or cartridges (including loading matters such as battery or the like) loaded thereon.

What is claimed is:

1. A camera having a cartridge chamber arranged to accommodate therein a cartridge having a film stowed therein, said camera comprising:

a lock mechanism arranged to be controlled and driven by a motor to one of a locking position for locking a lid of the cartridge chamber to the cartridge chamber and an unlocking position for unlocking the lid of the cartridge chamber to be openable and closable;

a first control circuit arranged to judge whether the camera satisfies a predetermined operation condition and, if the predetermined operation condition is satisfied, to control and drive said lock mechanism from the locking position to the unlocking position; and a second control circuit arranged to allow said lock mechanism to be driven from the locking position to the unlocking position in response to a specific operation if the predetermined operation condition is not satisfied.

2. A camera according to claim 1, wherein said second control circuit judges that said specific operation has been performed, when an operation different from an operation for executing an ordinary photo-taking action has been performed.

3. A camera according to claim 2, wherein said operation different from an operation for executing an ordinary photo-taking action is a state in which switch members provided for executing respective different actions are simultaneously operated for a predetermined period of time.

4. A camera according to claim 2, wherein said operation different from an operation for executing an ordinary photo-taking action is an operation performed on an operation member which is disposed at such a position of a body of said camera that is not exposed externally from the body of said camera.

5. A camera having a cartridge chamber arranged to accommodate therein a cartridge having a film stowed therein, said camera comprising:

a lock mechanism arranged to be controlled and driven to one of a locking position for locking a lid of the cartridge chamber to the cartridge chamber and an unlocking position for unlocking the lid of the cartridge chamber to be openable and closable;

a communication terminal capable of being connected to an adjustment tool and arranged to perform communication with said adjustment tool in a state of being connected to said adjustment tool;

storage means having a driving control program stored therein for driving said lock mechanism from the locking position to the unlocking position; and a control circuit which performs said driving control program when the camera satisfies a predetermined operation condition and performs said driving control program by receiving predetermined data from said adjustment tool through said communication terminal even when the camera does not satisfy said predetermined operation condition.

6. An apparatus having an accommodation section arranged to accommodate therein a recording medium, said apparatus comprising:

a lock mechanism arranged to be controlled and driven to one of a locking position for keeping said recording medium in said accommodation section and an unlocking position for unlocking the keeping of the recording medium in the accommodation section;

a first control circuit arranged to judge whether the apparatus satisfies a predetermined condition, if the predetermined condition is satisfied, to control and drive said lock mechanism from the locking position to the unlocking position; and a second control circuit arranged to allow said lock mechanism to be driven from the locking position to the unlocking position in response to a specific operation if the predetermined condition is not satisfied.

7. An apparatus having an accommodation section arranged to accommodate therein a recording medium, said apparatus comprising:

a lock mechanism arranged to be controlled and driven to one of a locking position for keeping the recording medium in the accommodation section and an unlocking position for unlocking the keeping of the recording medium in the accommodation section;

a communication terminal capable of being connected to an adjustment tool and arranged to perform communication with said adjustment tool in a state of being connected to said adjustment tool;

storage means having a driving control program stored therein for driving said lock mechanism from the locking position to the unlocking position; and a control circuit which performs said driving control program when the apparatus satisfies a predetermined operation condition and performs said driving control program by receiving predetermined data from said adjustment tool through said communication terminal even when the apparatus does not satisfy said predetermined operation condition.

8. A camera having a cartridge chamber arranged to accommodate therein a cartridge having a film stowed therein, said camera comprising:

a lock mechanism having a locking state in which a lid of the cartridge chamber is locked to the cartridge chamber and an unlocking state in which the lid of the cartridge chamber is unlocked to be openable and closable, said lock mechanism being arranged to operate according to movement of a lens barrel in such a way as to come into the locking state when the lens barrel is located within a first range of position including a photo-taking position and to come into the unlocking state when the lens barrel is located at a specific position which differs from the first range of position;

a lens driving mechanism arranged to move the lens barrel to the specific position when a predetermined condition including completion of film rewinding is satisfied;

a communication terminal capable of being connected to an adjustment tool and arranged to perform communication with said adjustment tool in a state of being connected to said adjustment tool;

storage means having a control program stored therein for shifting said lock mechanism from the locking state to the unlocking state; and a control circuit arranged to execute the control program upon receipt of predetermined data from said adjustment tool through said communication terminal.

9. A camera according to claim 8, wherein said control program is executed if the predetermined data is received from said adjustment tool through said communication terminal when the predetermined condition is not satisfied.

* * * * *

UNITED STATES PATENT AND TRADEMARK OFFICE
CERTIFICATE OF CORRECTION

PATENT NO. : 6,512,893 B2
DATED : January 28, 2003
INVENTOR(S) : Hajime Watanabe It is certified that error appears in the above-identified patent and that said Letters Patent is hereby corrected as shown below:

Column 8,
Line 42, delete ""b 01h"," and insert -- "01h", --.

Signed and Sealed this

Twenty-third Day of September, 2003

JAMES E. ROGAN
*Director of the United States Patent and Trademark Office*